United States Patent
Bajan et al.

(10) Patent No.: US 8,976,544 B2
(45) Date of Patent: Mar. 10, 2015

(54) RESONANT CIRCUIT INVERTER WITH CONTROLLABLE OPERATING POINT

(75) Inventors: Liviu Bajan, Dettingen (DE); Samir Elgharib, Warstein (DE)

(73) Assignee: AEG Power Solutions B.V., Zwanenburg (NL)

(*) Notice: Subject to any disclaimer, the term of this patent is extended or adjusted under 35 U.S.C. 154(b) by 500 days.

(21) Appl. No.: 13/299,498

(22) Filed: Nov. 18, 2011

(65) Prior Publication Data
US 2012/0275200 A1 Nov. 1, 2012

(30) Foreign Application Priority Data
Apr. 29, 2011 (EP) .................................... 11164316

(51) Int. Cl.
H02M 7/48 (2006.01)
H02M 7/5387 (2007.01)
H05B 6/06 (2006.01)

(52) U.S. Cl.
CPC ............. H02M 7/53871 (2013.01); H05B 6/06 (2013.01); *H02M 2007/4815* (2013.01); *Y02B 70/1441* (2013.01)
USPC ........................................................ 363/17

(58) Field of Classification Search
CPC .................... H02M 2007/4815; H02M 7/4826
USPC ...................... 363/17, 34, 36, 37, 40; 387/110
See application file for complete search history.

(56) References Cited

U.S. PATENT DOCUMENTS

| 4,471,196 A | 9/1984 | Frank et al. |
| 6,011,708 A * | 1/2000 | Doht et al. ...................... 363/98 |
| 7,084,601 B2 * | 8/2006 | Maeda et al. ................... 363/40 |

FOREIGN PATENT DOCUMENTS

| EP | 0 430 358 A1 | 6/1991 |
| EP | 0 619 692 A2 | 10/1994 |

OTHER PUBLICATIONS

Ogiwara H. et al. "Resonat High-Frequency Inverters Using Static induction Transistors", Power Electronic and Variable-Speed Drives, pp. 29-36, Jan. 1, 1988.
European Search Report of EP 11 16 4316 dated Mar. 9, 2012.

* cited by examiner

*Primary Examiner* — Adolf Berhane
*Assistant Examiner* — Jye-June Lee
(74) *Attorney, Agent, or Firm* — Cohen & Hildebrand, PLLC

(57) ABSTRACT

A resonant circuit inverter with a rectifier, a DC link circuit and an inverter including controllable switches. The resonant circuit inverter has a first control means, with which the operating point ($A_p$) of the resonant circuit inverter determined by a phase angle between an output current ($I_{ist}$) and a voltage ($U_{ist}$) at the output of the resonant circuit inverter is controlled. The first control means determines frequency of the output current ($I_{ist}$). The resonant circuit inverter has a phase detector for determining an actual phase angle as a function of a zero crossing of the output current ($I_{ist}$). The resonant circuit inverter has means for detecting a zero crossing of the output current ($I_{ist}$). For determining the actual phase angle, the difference ($T_i - T_t$) is determined from measured time ($T_i$) and a known dead time ($T_t$).

Figure 1:
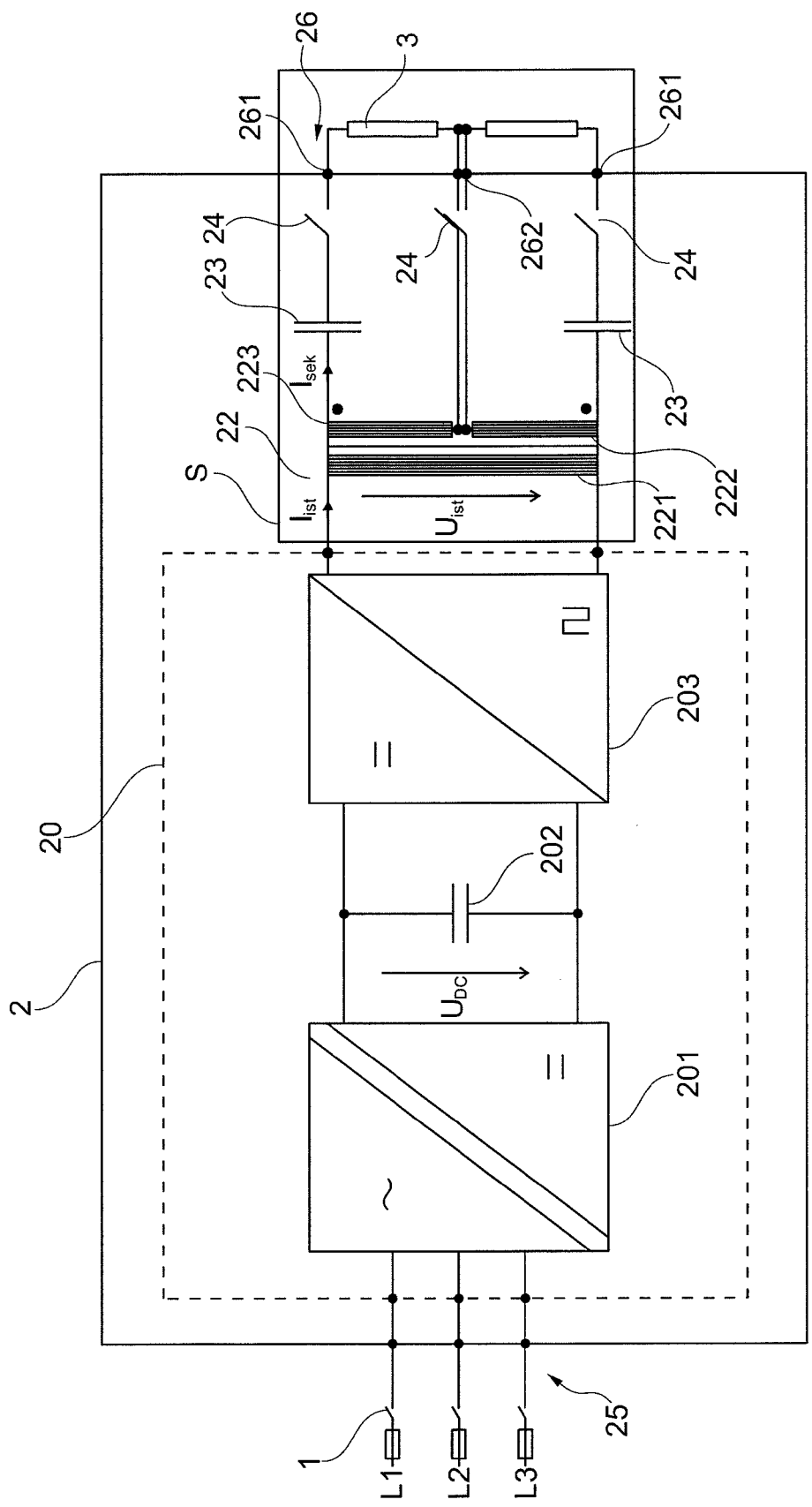

12 Claims, 4 Drawing Sheets ically heat materials. Materials may also be heated by conducting current through the materials and using their effective resistance, as is the case, for example, when heating silicon rods or thin silicon rods in the manufacture of polysilicon by chemical vapor deposition with the Siemens process.

RESONANT CIRCUIT INVERTER WITH CONTROLLABLE OPERATING POINT

BACKGROUND OF THE INVENTION (1) Field of the Invention

The present invention relates to a resonant circuit inverter with a controllable operating point.

(2) Description of Related Art

Resonant circuit inverters are described, for example, in the textbook "Leistungselektronik" (*Power Electronics*) by Rainer Felderhoff, published by Carl Hanser Verlag, $2^{nd}$ edition, ISBN 3-446-18993-9. The resonant circuit inverters described therein have, for example, a three-phase rectifier, a DC-link circuit and a single-phase inverter, with the output of the inverter forming the output of the resonant circuit inverter through which the current flows to the connected load.

Resonant circuit inverters are frequently used as frequency converters.

The document EP 0 617 503 A1 describes a method and an apparatus for controlling the operating point of a resonant circuit inverter. The resonant circuit inverter disclosed in this document is used for inductive heating of a heated material. The document describes the significance of the frequency of the current in the load circuit selected for inductive heating. The frequency of the output current is advantageously either slightly greater than the resonance frequency or slightly smaller than the resonance frequency, depending on the selection and/or availability of the electro-technical components. As also described in the document, the load circuit then assumes an inductive characteristic or a capacitive characteristic, which means that the output current is either lagging or leading the voltage at the output of the resonant circuit inverter. The operating point for operating the resonant circuit inverter described in the document is determined by the phase angle between the output current and the voltage at the output of the resonant circuit inverter.

In the aforedescribed inductive heating application, the parameter in the load circuit changes due to the heating, causing the resonance frequency to change. The phase angle between the output current and the voltage at the output of the resonant circuit inverter also changes, i.e., the operating point changes, which is undesirable.

It was an object of the solution described in the aforementioned document to propose a method and an apparatus for controlling the operating point of a series resonance circuit inverter, so that the predetermined operating range for the resonant circuit inverter can be identified and kept stable independent of parameter variations of the oscillating circuit elements.

The aforementioned document discloses a control of the phase angle, wherein the controller evaluates the difference between a nominal phase angle and an actual phase angle and depending on the evaluation adjusts the frequency of the output current by operating on the inverter. The phase angle may be, for example, the angle between the output current and the voltage at the output of the inverter.

The document also describes using the phase angle between other quantities, because using particularly the output current may sometimes be disadvantageous.

A resonance circuit inverter can not only be used to inductively heat materials. Materials may also be heated by conducting current through the materials and using their effective resistance, as is the case, for example, when heating silicon rods or thin silicon rods in the manufacture of polysilicon by chemical vapor deposition with the Siemens process.

As in inductive heating of materials, when heating silicon rods or thin silicon rods (also referred to as silicon seed rods), the growth of the silicon rods or thin silicon rods changes parameters in the oscillating circuit. The resonance frequency of the oscillating circuit then also changes with chemical vapor deposition, requiring an adjustment of the operating point commensurate with this change. The operating point can be adjusted in vapor deposition as well as in inductive heating by changing the phase angle between the output current and the voltage at the output of the resonant circuit inverter.

Double-commutations may occur in a resonant circuit inverter, in particular when using a single phase inverter with H-connection, at frequencies close to the resonance frequency, which causes in short succession directional changes in the output current. These multiple directional changes result in several zero crossings of the output current, making detection of a zero crossing for detecting the phase angle between the output current and the voltage at the output of the resonant circuit inverter at least difficult.

This is a starting point for the invention.

BRIEF SUMMARY OF THE INVENTION

It is an object of the invention to propose a resonant circuit inverter which allows a control of the phase angle, i.e., of the operating point, without requiring detecting the zero crossing of the output voltage.

This object is attained with the invention in that for determining the actual phase angle, wherein a difference can be determined between a measured time which can be measured between a time when a turn-on pulse is applied to a control electrodes of a controllable switch of the inverter receiving the output current and the time of the subsequent zero crossing of the output current, and a known dead time between the time when a turn-on pulse is applied to a terminal of the inverter for receiving the output current by a controllable switch of the inverter and a subsequent reversal of the voltage at the output of the inverter.

At a known frequency, the phase angle between the times of the end of the dead time and the zero crossing of the output current within one period of the output current and/or the output voltage can be determined from this difference, without creating a problem for a skilled artisan.

A resonant circuit inverter according to the invention may include a second control means for controlling the output current. If the output current provided by the resonant circuit inverter is not sufficient even when the phase angle is properly controlled, then the output current can be controlled, so that the actual output current can reach a desired nominal output current. Advantageously, control of the output current is here slower than control of the phase angle, so that the resonant circuit inverter is always operated at the desired operating point and with the output current resulting at the desired operating point.

A means for forming a control difference from a signal for a nominal output current and a signal for an actual output current measured with a current sensor may be associated with the second control means. The resonant circuit inverter may include a means for forming the absolute value of the control difference and for comparing the absolute value of the control difference with a predetermined value. Depending on a result of this comparison, either only the first control means for controlling the phase angle may be activatable or deactivatable, or both the first control means for controlling the phase angle and the second control means for controlling the output current may be activatable or deactivatable.

For a small control deviation of the output current, the intent is to achieve the desired current by first controlling the phase angle, i.e., the operating point. This is particularly useful if the control difference between the actual phase angle and the nominal phase angle is large and the frequency adjusted at the inverter is significantly different from the resonance frequency. In this case, one can assume that a substantially larger current may be attained at the operating point with the desired nominal phase angle than with the adjusted frequency.

Control of the output current is activated only if this is not sufficient or if the magnitude of the control deviation is too large. A control value for the DC voltage in the DC-link circuit is then supplied to the rectifier. The rectifier can adjust (preferably control) this voltage in the DC-link circuit. Because the output current depends directly from the DC-link voltage, the output current can be controlled by changing the DC-link voltage.

When operating a resonant circuit inverter according to the invention, the resonance frequency can be initially determined for initializing the resonant circuit inverter. The resonance frequency can be determined by decreasing the frequency, starting from a start value, and then measuring the output current. The frequency where the largest output current is measured can then be determined as the resonance frequency. Because no reactive current is present in the output circuit, the highest effective current is measured at resonance. The resonance frequency can thus be determined in practice by measuring the output current.

After the resonance frequency is determined, the phase angle can be controlled with the first control means for the phase angles. For controlling the phase angle, the difference can be determined between a measured time which can measured between a time when a turn-on pulse is applied to a control electrode of a controllable switch of the inverter receiving the output current and the time of the subsequent zero crossing of the output current, and a known dead time between the time when a turn-on pulse is applied to a control electrode of a controllable switch of the inverter receiving the output current and a subsequent reversal of the voltage at the output of the inverter.

The actual phase angle can then be determined from the difference and a control difference can be formed from a nominal phase angle and the actual phase angle. The frequency can be changed with the first control means depending on the control difference of the nominal phase angle and the actual phase angle as a controlled variable for the inverter, so that the nominal phase angle is adjusted at the output of the inverter.

After the phase angle is property adjusted, control of the output current with the second control means can be started, if a magnitude of a control difference between the nominal output current and the actual output current is greater than a predetermined value.

BRIEF DESCRIPTION OF THE SEVERAL VIEWS OF THE DRAWING(S)

Additional features and advantages of the present invention will now be described with reference to the drawings, which show in FIG. 1 a high-level circuit diagram of a circuit arrangement according to the invention with a resonant circuit inverter according to the invention and loads connected to the circuit arrangement, FIG. 2 resonance curves of the resonant circuit inverter and of components connected thereto, FIG. 3 the curve shape of an output voltage of the resonant circuit inverter, of an output current of the resonant circuit inverter, of an output current of the circuit arrangement, and of a control voltage applied on a control electrode of a rectifier valve of the inverter over slightly more than one period, FIG. 4 a detail of FIG. 3, and FIG. 5 a schematic control circuit diagram of the circuit arrangement according to the invention.

DETAILED DESCRIPTION OF THE INVENTION

Figure 2:
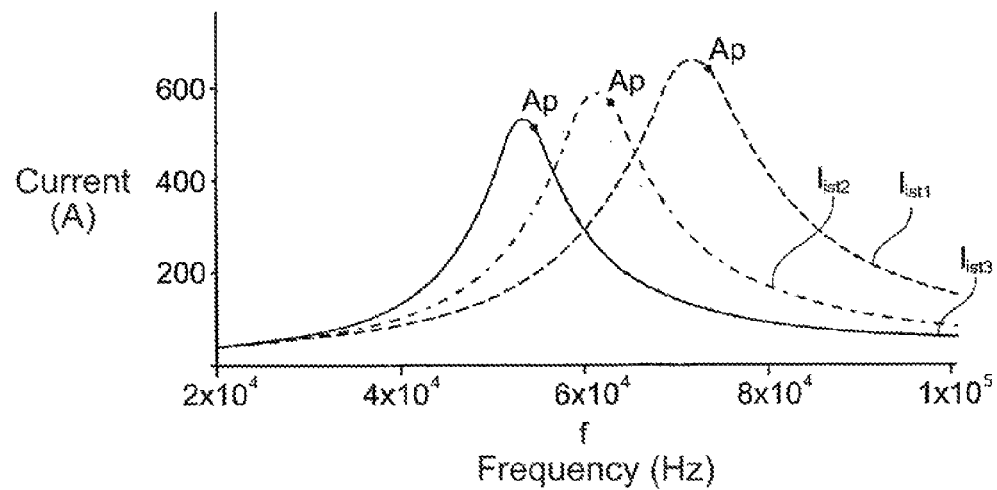

FIG. 1 illustrates only the power-electronic components of the circuit arrangement according to the invention. Controllers, measurement transducers or other components or elements required for regulating or controlling the power-electronic components are not shown.

The circuit arrangement according to the invention illustrated in FIG. 1 has a three-phase input 25 with terminals connected with a three-phase network L1, L2, L3 via switches and fuses 1. The network may be a public low-voltage power grid. The circuit arrangement according to the invention produces from the three-phase AC voltage at the input 25 a 2-phase AC voltage across the output 26 of the circuit arrangement 2.

The voltages of the two-phase AC voltage are shifted with respect to each other by 180°, i.e. by half a period, and thus have opposite phases. Furthermore, the voltages of the two-phase AC voltage system have the same effective value. The voltage between the phase conductors of the two-phase AC voltage system is therefore zero.

Each of the outputs 26 has a phase conductor terminal 261 and a center conductor terminal 262. A respective load 3 is connected between the corresponding phase conductor terminal 261 and a center conductor terminal 262. This load may be, for example, one or several silicon rod pairs in a Siemens reactor.

It is the object of the circuit arrangement according to the invention to produce, inter alia, the two-phase AC voltage from the three-phase AC voltage.

It is another object of the circuit arrangement 2 according to the invention to enable with the circuit arrangement 2 according to the invention an adjustment of the frequency of the two-phase AC voltage at the outputs 26.

It is yet another object to be able to enable with the circuit arrangement 2 according to the invention an adjustment of the current through the outputs 26.

For adjusting the frequency of the current and the magnitude of the current flowing through the outputs 26 of the circuit arrangement 2 according to the invention, the circuit arrangement 2 according to the invention has a resonant circuit inverter 20.

The resonant circuit inverter 20 includes as a rectifier a six-pulse bridge circuit (B6 circuit), a three-phase AC current transformer connected upstream of the bridge circuit and enabling galvanic isolation from the network. The six-pulse bridge circuit includes controllable converter valves, so that the DC voltage at the output of the six-pulse bridge circuit can be adjusted. The transformer and the six-pulse bridge circuit are indicated in FIG. 1 by a symbol having the reference number 201.

In the so-called DC link circuit, a capacitor 202 is connected in parallel with the output of the six-pulse bridge circuit, as is known in the art.

An inverter 203 is connected downstream of the DC link circuit with the capacitor 202. The inverter 203 is a single-phase inverter with an H-circuit of converter valves.

The frequency of the current supplied by the inverter 203 depends on the switching frequency of the converter valves of the inverter 203. The magnitude $I_{ist}$ of the current supplied by the inverter depends on the DC voltage $U_{DC}$ in the DC link circuit, which can be adjusted by way of the six-pulse bridge circuit.

The resonant circuit inverter 20 is essentially known in the art.

A transformer 22 is connected downstream of the resonant circuit inverter 20. The transformer 22 has a primary winding 221 which is connected to the output of the inverter 203 or the output of the resonant circuit inverter 20, respectively. The transformer 22 moreover has two secondary windings 222, 223. The two secondary windings 222, 223 are wound in opposite directions and arranged on a leg of a transformer core of the transformer 22. They are therefore penetrated by the same magnetic field.

Adjacent ends of the secondary windings 222, 223 are connected with one another and form the center point of the two-phase voltage system provided at the output of the circuit arrangement 2 according to the invention. The center point is connected with terminals 262 of the outputs 26 of the circuit arrangement 2 by way of switches 24.

The remaining opposite ends of the secondary windings 222, 223 are each connected with the terminal 261 of the outputs 26 via a corresponding capacitor 23 and a switch 24. These terminals form the terminals for the phase conductors of the two-phase voltage system provided by the circuit arrangement 2 according to the invention.

The transformer 22, the capacitors 23 and the loads 3 form an oscillator circuit S at the output of the resonant circuit inverter 20. As any oscillator circuit, this oscillator circuit has a resonance frequency.

The effective power converted in the oscillator circuit S is highest when the frequency of the output current flowing via the output of the resonant circuit inverter 20 and hence via the oscillator circuit S is equal to the resonance frequency. The reactive power in the resonance circuit S is then as small as possible.

It would therefore be desirable to operate the inverter 203 of the resonant circuit inverter 20 at the resonance frequency of the oscillator circuit S.

However, it has been observed that it is disadvantageous for several reasons to operate the inverter at the resonance frequency of the oscillator circuit. For example, undesirable double commutations occur during the operation of the inverter 203.

These can be prevented if the frequency is slightly higher than the resonance frequency of the oscillator circuit S. If the frequency is slightly higher than the resonance frequency, then a phase angle is present between the output current $I_{ist}$ of the resonant circuit inverter 20 and the output voltage $U_{ist}$ of the resonant circuit inverter 20.

This also indicates that the operating point is in an inductive range, so that the diodes are not so highly loaded and the dissipated power through the diodes is not high. The double commutations do not occur.

According to the invention, the operating point for operating the resonant circuit inverter 20 is determined by a predetermined phase angle. Once a predetermined phase angle is adjusted, the resonant circuit inverter 20 is operated at the desired operating point.

Because at least the loads 3 of the oscillator circuit S have a changeable impedance—these are silicon rods whose resistance changes—the parameter of the oscillator circuit S change during operation of the circuit arrangement according to the invention, causing a change in the resonance frequency. For example, the resonance frequency may increase, as indicated in FIG. 2.

To always maintain the same operating point, the frequency at which the inverter 203 is operated, must thus be adjusted commensurate with the frequency of the output current $I_{ist}$. For this purpose, the phase angle between a current $I_{ist}$ and a voltage $U_{ist}$ at the output of the resonant circuit inverter 20 is controlled in the resonant circuit inverter 20 according to the invention. Instead of the output current $I_{ist}$ of the resonant circuit inverter 20, a load current $I_{sek}$ through one of the loads 3 could also be used for determining the phase angle, because this load current $I_{sek}$ is in phase with the output current $I_{ist}$ of the resonant circuit inverter 20.

However, measuring the zero crossing of the output voltage $U_{ist}$ at frequencies close to the resonance frequency poses a problem. The zero crossing of the output voltage $U_{ist}$ cannot be unambiguously or reliably determined due to double commutations in a frequency band around the resonance frequency. The double commutations can be seen in FIGS. 3 and 4 from the curve shape $U_{ist}$ of the output voltage of the resonant circuit inverter.

Figure 3:
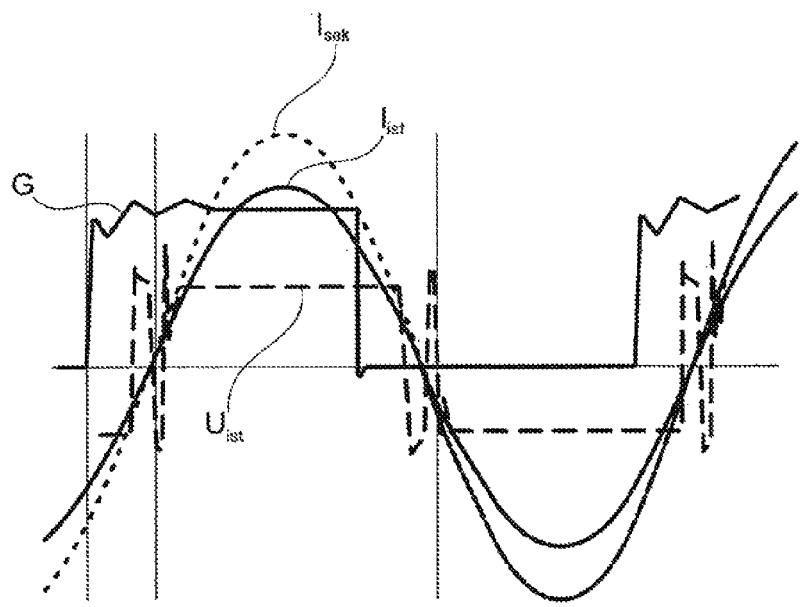
Figure 4:
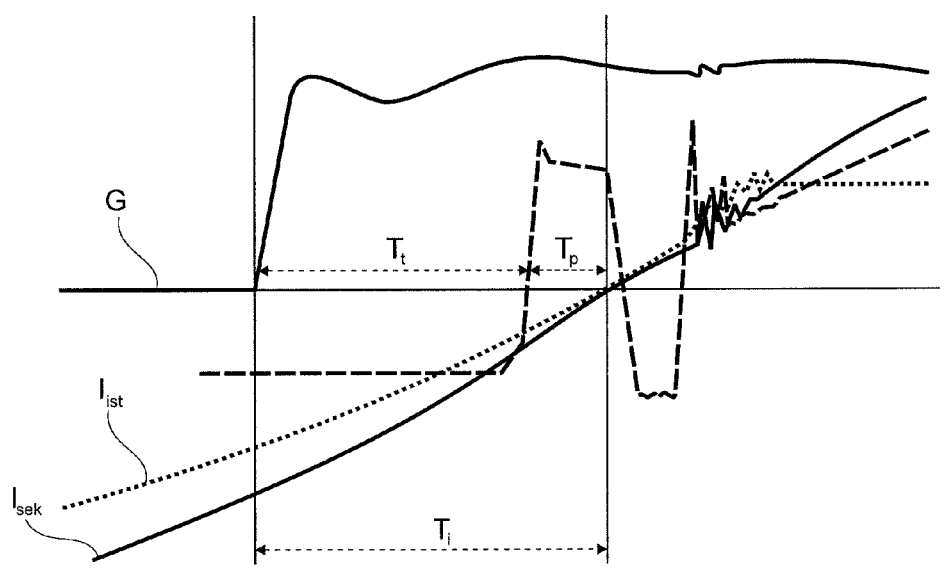

The invention is based on the observation illustrated in FIGS. 3 and 4, that the zero crossing or inversion point of the output voltage $U_{ist}$ relevant for determining the phase angle has a fixed temporal relationship to the time when a turn-on pulse of a control signal G is applied to a terminal of the inverter for receiving the output current $I_{ist}$ through a controllable switch of the inverter. This fixed temporal relationship is determined by a dead time $T_t$ stored in a driver of the inverter which transmits the turn-on pulse applied to the inverter to the electrode of the switch receiving the current only after the expiration of the dead time $T_t$. This delayed transmission is necessary to prevent short-circuits during the commutation process.

The dead time $T_t$ is determined by the driver.

Because the dead time $T_t$ is known, it is sufficient for determining the actual phase angle to measure the time of the zero crossing of the output current $I_{ist}$. This time can be measured, for example, in reference to the start of the turn-on pulse of the turn-on signal G. Once the time $T_i$ between the start time of the turn-on pulse and the zero crossing of the output current $I_{ist}$ has been measured, the time $T_p$ between the zero crossings of the output voltage $U_{ist}$ and of the output current $I_{ist}$ can be determined by forming the difference between the measured time $T_i$ and the dead time $T_t$. For a known frequency, the phase angle can then be readily determined.

Figure 5:
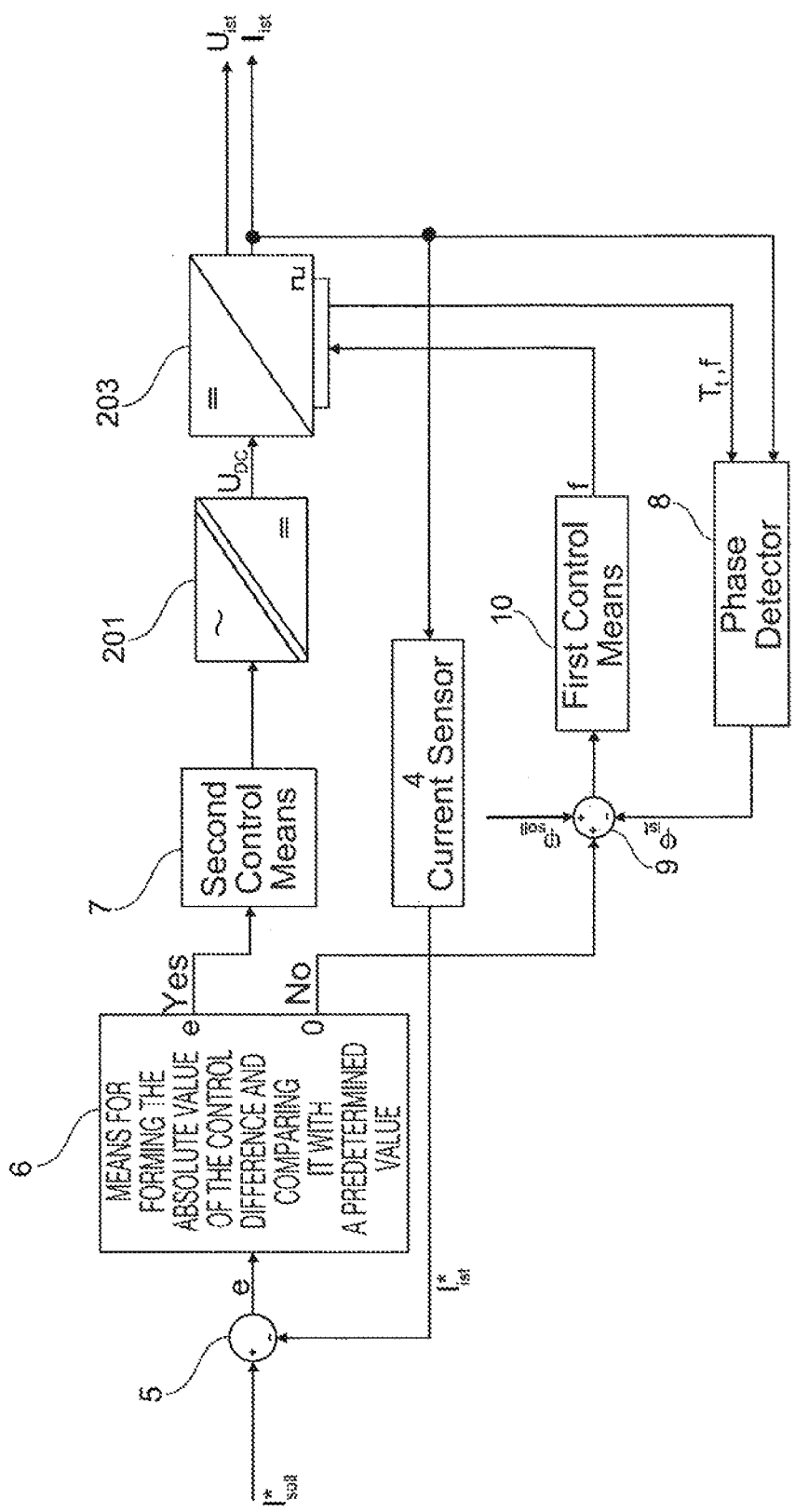

The phase angle and hence the operating point of the circuit arrangement according to the invention can now be controlled with the invention, as illustrated in FIG. 5.

The circuit arrangement according to the invention is controlled by two control circuits, with one control circuit controlling the phase angle (and hence controlling the operating point) and one control circuit controlling the output current $I_{ist}$.

The control circuit for controlling the phase angle has a phase detector 8 which can be used to determine an actual phase angle as a function of a zero crossing of the output current $I_{ist}$. A means for detecting a zero crossing of the output current $I_{ist}$ is integrated in the phase detector. The phase detector has an input via which the actual output current is supplied to the phase detector.

For determining the phase angle, the phase detector still needs information about the zero crossing of the output voltage $U_{ist}$. This information is provided to the phase detector 8 by the inverter 203. The information includes the dead time $T_t$ and the start time of the turn-on pulse of the turn-on signal G. The phase detector 8 can determine from this information the actual phase angle and the time of the zero crossing of the output current $I_{ist}$ for a known frequency, whose value is also provided by the inverter 203.

The actual phase angle or a signal representing the actual phase angle is subtracted from the predetermined nominal phase angle in a means 9 for forming a control difference, which determines the desired operating point. The control difference determined in this manner is supplied to a first control means 10 which determines from the control difference a controlled variable. The controlled variable is the frequency f which is adjusted at the inverter 203 to minimize the control difference.

The control circuit for controlling the output current $I_{ist}$ includes a current sensor 4 which converts the actual current of the output current $I_{ist}$ into a signal representing the actual current. For forming the control difference e, this signal representing the actual current is subtracted from the reference variable, i.e., from a signal representing the nominal current, in a means 5 for forming the control difference e.

This control difference e is then initially further evaluated. This evaluation takes place in a means 6 for forming the absolute value of the control difference and for comparing the absolute value of the control difference with a predetermined value. For this evaluation, the absolute value of the control difference is first formed in the means 6 and subsequently compared with a predetermined value. If the value of the control difference is greater than the predetermined value, then a second control means 7 for controlling the output current $I_{ist}$ is activated. The second control means 7 for controlling the output current may be a PI controller. The second control means 7 generates a controlled variable which operates on the rectifier 201 to change the DC link voltage $U_{DC}$, from which the output current $I_{ist}$ of the inverter 203 and of the entire resonant circuit inverter 20 depends.

The invention claimed is:

1. A resonant circuit inverter (20) comprising:
   a rectifier (201),
   a DC link circuit (202), and
   an inverter (203) including controllable switches and an output forming an output of the resonant circuit inverter (20), via which a current of a connectable load is transmitted,
   a first control means (10) with which an operating point ($A_p$) of the resonant circuit inverter (20) determined by a phase angle between an output current ($I_{ist}$) and an output voltage ($U_{ist}$) at the output of the resonant circuit inverter (20) is being controlled, wherein the first control means (10) determines as a controlled variable a frequency of the output current ($I_{ist}$) to be adjusted with the inverter (203),
   a phase detector (8) with which an actual phase angle is determined as function of a zero crossing of the output current ($I_{ist}$),
   a means for detecting a zero crossing of the output current ($I_{ist}$), wherein the actual phase angle is determined based on a time ($T_p$) between zero crossings of the output voltage ($U_{ist}$) and of the output current ($I_{ist}$), wherein the time ($T_p$) is a difference ($T_i$–$T_t$) between a measured time ($T_i$) and a dead time (Tt), wherein the measured time (Ti) is between a time when a turn-on pulse is applied to a terminal of a controllable switch of the inverter (203) receiving the output current ($I_{ist}$) and a time of a subsequent zero crossing of the output current ($I_{ist}$), and the dead time ($T_t$) is between a time when a turn-on pulse is applied, to a terminal of the inverter (203) which receives the output current via the controllable switch of the inverter (203) and a subsequent reversal of a voltage at the output of the inverter (203),
   a second control means (7) with which the output current ($I_{ist}$) is controlled, and
   a means (5) for forming a control difference (e) from a signal ($I^*_{soll}$) for a nominal output current and a signal ($I^*_{ist}$) for an actual output current ($I_{ist}$), as determined with a current sensor, is associated with the second control means (7).

2. The resonant circuit inverter (20) according to claim 1, further comprising a means (6) for forming an absolute value (|e|) of the control difference (e) and for comparing the absolute value (|e|) of the control difference (e) with a predetermined value.

3. The resonant circuit inverter (20) according to claim 2, wherein depending on a result of the comparison, either the first control means (10) for controlling the phase angle is being activated or deactivated, or the first control means (10) for controlling the phase angle and the second control means (7) for controlling the output current ($I_{ist}$) is being activated or deactivated.

4. A method for operating a resonant circuit in inverter (20) including a rectifier, a DC link circuit (202), an inverter (203) including controllable switches in which an output of the inverter (203) forms an output of the resonant circuit inverter (20) via which a current of a connectable load is transmitted, a first control means (10) with which an operating point ($A_p$) of the resonant circuit inverter (20) determined by a phase angle between an output current ($I_{ist}$) and a voltage ($U_{ist}$) at the output of the resonant circuit inverter (20) is controlled, a phase detector (8) for determining an actual phase angle as a function of a zero crossing of the output current ($I_{ist}$), comprising the step of: determining a resonance frequency first for initializine the resonant circuit inverter (20).
   wherein the step of determining the resonance frequency comprises decreasing a frequency of the resonant circuit inverter starting from an initial value and measuring the output current($I_{ist}$), and the frequency of the resonant circuit inverter associated with a largest output current ($I_{ist}$) is determined as the resonance frequency.

5. The method according to claim 4, wherein after the resonance frequency is determined, controlling of the phase angle with the first control means (10) begins, 6. The method according to claim 5, further comprising the step of controlling the phase angle is based on a time ($T_p$) between zero crossings of the output voltage ($U_{ist}$) and of the output current ($I_{ist}$), wherein the time ($T_p$) is a difference ($T_i$–$T_t$) between a measured time ($T_i$) and a known dead time (Tt), wherein the measured time ($T_i$) is measured between a time when a turn-on pulse is applied to a terminal of a controllable switch of the inverter (203) receiving the output current ($I_{ist}$) and a time of a subsequent zero crossing of the output current ($I_{ist}$), and the known dead time ($T_t$) is between the time when the turn-on pulse is applied to the terminal of the controllable switch of the inverter (203) receiving the output current ($I_{ist}$) and a subsequent reversal of the voltage ($U_{ist}$) at the output of the inverter (203), 7. The method according to claim 6, wherein the actual phase angle ($\Phi_{ist}$) is determined from the difference ($T_i$–$T_t$)

, and a control difference(e) is formed from a difference between a nominal phase angle ($\Phi_{soll}$) and the actual phase angle ($\Phi_{ist}$).

8. The method according, to claim 7, wherein the frequency of the resonant circuit inverter changes with the first control means (10) depending on the control difference (e) between the nominal phase angle ($\Phi_{soll}$) and the actual phase angle ($\Phi_{ist}$) as a controlled variable for the resonant circuit inverter (20), so that the nominal phase angle ($\Phi_{soll}$) is set at the output of the resonant circuit inverter (20).

9. The method according to claim 8, further comprising the step of controllinu the output current ($I_{ist}$) with a second control means (7), if an absolute value (|e|) of the control difference (e) between a nominal output current ($I_{soll}$) and an actual output current ($I_{ist}$) is greater than a predetermined value.

10. A circuit arrangement (2) comprising:
   a resonant circuit inverter (20) the resonant circuit inverter (20) further comprising:
      a rectifier (201),
      a DC link circuit (202),
      an inverter (203) including controllable switches and an output forming an output of the resonant circuit inverter (20), via which a current of a connectable load is transmitted,
      a first control means (10) with which an operating point ($A_p$) of the resonant circuit inverter (20) determined by a phase angle between an output current ($I_{ist}$) and an output voltage ($U_{ist}$) at the output of the resonant circuit inverter (20) is being controlled, wherein the first control means (10) determines as a controlled variable a frequency of the output current ($I_{ist}$) to be adjusted with the inverter (203),
      a phase detector (8) with which an actual phase angle is determined as a function of a zero crossing of the output current ($I_{ist}$),
      a means for detecting a zero crossing of the output current ($I_{ist}$),
      wherein the actual phase angle is determined based on a time ($T_p$) between zero crossings of the output voltage ($U_{ist}$) and of the output current ($I_{ist}$), wherein the time ($T_p$) is a difference ($T_i$–$T_t$) between a measured time ($T_i$) and a dead time (Tt), wherein the measured time (Ti) is between a time when a turn-on pulse is applied to a terminal of a controllable switch of the inverter (203) receiving the output current($I_{ist}$) and a time of a subsequent zero crossing of the output current ($I_{ist}$), and the dead time ($T_t$) is between a tune when a turn-on pulse is applied to a terminal of the inverter (203) which receives the output current via the controllable switch of the inverter (203) and a subsequent reversal of the voltage at the output of the inverter (203),
   wherein the circuit arrangement (2) has at the output of the resonant circuit inverter (20) a transformer (22) with a primary winding (221) and two oppositely wound secondary windings (223) with a same number of turns, which are connected with one another at one end, so that voltages with opposite polarities having the same or approximately the same absolute values tapped at the secondary windings (223), and voltage between ends of the secondary windings that are not connected with one another is approximately zero.

11. The circuit arrangement (2) according to claim 10, wherein the ends of the secondary windings that are not connected with one another are each connected in series with a respective output (26) of the circuit arrangement (2).

12. The circuit arrangement (2) according to claim 11, wherein a capacitor and/or a switch is arranged between the ends of the secondary windings that are not connected with one another and a terminal of the outputs (26).

* * * * *